US006603823B1

(12) United States Patent
Yellin et al.

(10) Patent No.: US 6,603,823 B1
(45) Date of Patent: Aug. 5, 2003

(54) CHANNEL ESTIMATOR

(75) Inventors: Daniel Yellin, Ra'anana (IL); Doron Rainish, Ramat Gan (IL); Rony Ashkenazi, Moshav Kidron (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/438,475

(22) Filed: Nov. 12, 1999

(51) Int. Cl.$^7$ .............................. H03D 1/00; H04B 1/69
(52) U.S. Cl. .................... 375/340; 375/341; 375/130
(58) Field of Search .................... 375/34, 130, 148, 375/341, 346, 349; 370/500, 522, 525; 329/349, 353; 371/43.7, 43.5, 43.6

(56) References Cited

U.S. PATENT DOCUMENTS

| | | | | |
|---|---|---|---|---|
| 5,867,538 A | * | 2/1999 | Liu .............................. | 375/341 |
| 5,887,035 A | * | 3/1999 | Molnar ........................ | 375/340 |
| 6,377,607 B1 | * | 4/2002 | Ling et al. ................... | 375/130 |
| 6,442,218 B1 | * | 8/2002 | Nakamura et al. ........... | 375/340 |

OTHER PUBLICATIONS

3GPP RAN 25.214, v1.1.1, (Sep. 1999) Physical Layer Procedures.
Turkboylari et al., "An Efficient Algorithm for Estimating the Signal–to–Interference Ration in TDMA Cellular Systems", IEEE Trasactions on Communications, vol. 46, No. 6, Jun. 1998, pp. 728–731.
Press et al., *Numerical Recipes in C: The Art of Scientific Computing, 2$^{nd}$* Edition, Cambridge University Press, 1992.
Adachi et al., "Wideband Wireless Access Based on DS–CDMA", IEEE Transactions on Communications, pp. 1305–1316, Jul. 1998.
Adachi et al., "Wideband DS–CDMA for Next–Generation Mobile Communications Systems", IEEE Communications Magazine, Sep. 1998, pp. 56–69.
3GPP RAN TS 25.215, v0.0.1 (Sep. 1999) Physical Layer— Measurements.
Schramm et al., "Pilot Symbol Assisted BPSK on Rayleigh Fading Channels with Diversity: Performance Analysis and Parameter Optimization", IEEE Transactions on Communications, vol. 46, No. 12, Dec. 1998, pp. 1560–1563.

* cited by examiner

Primary Examiner—Stephen Chin
Assistant Examiner—Edith Yeh
(74) Attorney, Agent, or Firm—Eitan, Pearl, Latzer & Cohen-Zedek, LLP.

(57) ABSTRACT

The present invention is a channel estimator based on the values of received data and on a priori probabilities only of received symbols. The channel estimator includes a symbol probability generator, a noise variance estimator and a channel tap estimator. The symbol probability generator generates a priori probabilities only of transmitted symbols found in the received signal(s). The noise variance estimator estimates at least one noise variance corrupting the received signal(s). The channel tap estimator generates channel estimates from the received signal(s), the a priori probabilities and the noise variance(s).

27 Claims, 7 Drawing Sheets

CHANNEL ESTIMATOR

FIELD OF THE INVENTION

The present invention relates to channel estimators in wireless communication systems generally and to such channel estimators that operate on data and pilot signals in particular.

BACKGROUND OF THE INVENTION

In practical digital communication systems, the frequency response of the underlying channel from the transmitter to the receiver is seldom known at the receiver side. For example, in digital communication over the dial-up telephone network, the communication channel will be different every time a number is dialed, because the channel route will be different. In this example, the characteristics of the channel are unknown a priori. There are other types of channels, e.g. wireless channel such as radio channels and underwater acoustic channels, whose frequency response characteristics are time varying. Thus coherent communications for such channels require the utilization of adaptive algorithms, known as "channel estimators", for tracking/estimating the varying characteristics of the channel.

Traditionally, channel estimators are divided into two categories: data aided and non-data aided (blind) estimators. Data aided channel estimators operate on a pre-specified set of transmitted symbols that are known to the receiver. These symbols do not convey any information and are often called "pilot symbols" or "training sequences". Data aided channel estimators are typically simple to implement and relatively robust. Their major disadvantage is that they lead to an overall reduction in system throughput, since some of the transmitted symbols (the pilot symbols) do not carry any information.

Non data aided channel estimators, on the other hand, do not reduce the system throughput. However, they are typically quite complicated to implement as they are often based on higher order moments/cumulants of the received signal, and they most often suffer from high statistical variability, i.e. they suffer from large estimation errors.

The article "Maximum A Posteriori Multipath Fading Channel Estimation for CDMA Systems" by Mohamed Siala and Daniel Duponteil, *Proceedings of Vehicular Technology Conference*, Houston, Tex., May, 1999, describes a channel estimation algorithm which combines both approaches. This algorithm uses both pilot and data symbols to construct a channel estimator. However, this algorithm requires that the joint statistical probability distribution of the channel multipaths be known to the receiver. In practice, a complete statistical description of the channel characteristics is seldom known to the receiver. Moreover, these characteristics may be time varying.

SUMMARY OF THE INVENTION

An object of the present invention is to provide an improved channel estimator without using any a priori statistical information about the channel. Instead, the present invention uses a priori probabilities of the received symbols, be they pilot, data, power control, etc. symbols.

There is therefore provided, in accordance with a preferred embodiment of the present invention, a channel estimator based on the values of received data and on a priori probabilities only of received symbols. The channel estimator includes a symbol probability generator, a noise variance estimator and a channel tap estimator. The symbol probability generator generates a priori probabilities only of transmitted symbols found in the received signal(s). The noise variance estimator estimates at least one noise variance corrupting the received signal(s). The channel tap estimator generates channel estimates from the received signal(s), the a priori probabilities and the noise variance(s).

Additionally, in accordance with a preferred embodiment of the present invention, the channel tap estimator solves the following equation:

$$\hat{h}_{ML} = \frac{1}{2T} \cdot \sum_{t=1}^{T} \bar{y}(t) \cdot z(t; \hat{h}_{ML})^*$$

Moreover, in accordance with a preferred embodiment of the present invention, the channel tap estimator includes a z-unit, a combiner and a channel tap unit. The z-unit generates a z-value for $z(t; \hat{h}_{ML})$ from the a priori probabilities, the noise variance(s) and the channel estimates. The combiner combines the z-value with the received signal(s). The channel tap unit determines channel tap values from the output of the combiner.

Further, in accordance with a preferred embodiment of the present invention, the z-unit calculates the following equation for a quadrature phase shift keying (QPSK) channel:

$$z(t; \bar{h}) \equiv \left[ p_1(t)(1+j)e^{\frac{2}{\sigma^2}Real\{<\bar{y}(t),\bar{h}^*>(1-j)\}} + \right.$$
$$p_2(t)(1-j)e^{\frac{2}{\sigma^2}Real\{<\bar{y}(t),\bar{h}^*>(1-j)\}} +$$
$$p_3(t)(-1+j)e^{\frac{2}{\sigma^2}Real\{<\bar{y}(t),\bar{h}^*>(-1-j)\}} +$$
$$\left. p_4(t)(-1-j)e^{\frac{2}{\sigma^2}Real\{<\bar{y}(t),\bar{h}^*>(-1-j)\}} \right] \times$$
$$\left[ p_1(t)e^{\frac{2}{\sigma^2}Real\{<\bar{y}(t),\bar{h}^*>(-1-j)\}} + p_2(t)e^{\frac{2}{\sigma^2}Real\{<\bar{y}(t),\bar{h}^*>(-1+j)\}} + \right.$$
$$\left. p_3(t)e^{\frac{2}{\sigma^2}Real\{<\bar{y}(t),\bar{h}^*>(-1-j)\}} + p_4(t)e^{\frac{2}{\sigma^2}Real\{<\bar{y}(t),\bar{h}^*>(-1+j)\}} \right]^{-1}$$

where $\bar{y}(t)$ is a vector of the received signal(s), $\bar{h}$ is a vector of the channel tap estimates and $\bar{p}(t)$ is a vector of the symbol probabilities.

Still further, in accordance with a preferred embodiment of the present invention, the channel tap unit is a summer over a window of received symbols.

Additionally, in accordance with a preferred embodiment of the present invention, when s(t) is a pilot symbol, then $\bar{p}(t)=\bar{e}_i$ where the $\bar{e}_i$'s are the normal basis vectors having a one (1) in their i-th component and zero otherwise. When s(t) is a data symbol, then $$p_1(t)=p_2(t)=p_3(t)=p_4(t)=0.25$$

When s(t) is a transmit power control (TPC) symbols, then $$p_1(t)=p_4(t)=0.5, p_2(t)=p_3(t)=0$$

Moreover, in accordance with a preferred embodiment of the present invention, the channel tap unit includes an anchor unit, an averager and an interpolator. The anchor unit determines a pilot anchor $\hat{h}_p$ using $N_p$ pilot symbols of one time slot n and a data anchor $\hat{h}_s$ using $N_s$ data symbols of the time slot n. The averager averages the pilot and data anchors to produce a slot anchor $\hat{h}_{anchor}(n)$ and the interpolator interpolates between adjacent anchors $\hat{h}_{anchor}(n-1)$ and $\hat{h}_{anchor}(n)$ to obtain channel estimates for the n-th slot.

Further, in accordance with a preferred embodiment of the present invention, $N_s=2N_p$ and $N_p$ of the data symbols can be taken from before the pilot symbols of the time slot and $N_p$ of the data symbols can be taken from after the pilot symbols.

Still further, in accordance with a preferred embodiment of the present invention, the unit for linearly interpolates includes unit for separately interpolates amplitudes and phases of the adjacent anchors.

Additionally, in accordance with a preferred embodiment of the present invention, the channel estimator also includes a unit that averages slot anchors as follows:

$$\hat{H}_{anchor}(n-1) = \frac{\sum_{k=-M}^{M} \hat{h}_{anchor}(n-1-k) \cdot \beta_k}{\sum_{k=-M}^{M} \beta_k}$$

where $H_{anchor}$ is the average value of slot anchors $h_{anchor}$ in a slot ranging between the values $-M$ to $M$ for k, and $\beta_k$ is a user defined weight factor.

Moreover, in accordance with a preferred embodiment of the present invention, the z-unit includes a lookup table unit.

Further, in accordance with a preferred embodiment of the present invention, the at least one received signal is the output of at least one despreader. Alternatively, it could be the downconverted and demodulated output of more than one antenna.

Still further, in accordance with a preferred embodiment of the present invention, the noise variance estimator generates a noise variance $\hat{\sigma}^2$ as follows:

$$\hat{\sigma}_k^2(n) = (1-\alpha) \cdot \hat{\sigma}_k^2(n-1) + \alpha \cdot \sigma_k^2(n)$$

where the time index n is in units of slot, $\alpha$ is a user selectable exponential forgetting factor, and $$\tilde{\sigma}_k^2(n) \equiv \frac{1}{N_P} \sum_{t=1}^{N_P} \left| \frac{\bar{y}_k(t)}{G(t)} \cdot s(t)^* \right|^2 - \left| \frac{1}{N_P} \sum_{t=1}^{N_P} \frac{\bar{y}_k(t)}{G(t)} \cdot S(t)^* \right|^2$$

where $N_p$ is the number of pilot symbols per slot, $G(t)$ is an automatic gain control (AGC) level and $\bar{y}_k(t)$ is the k-th element of the vector $\bar{y}(t)$.

Further, in accordance with a preferred embodiment of the present invention, the channel tap unit is an infinite impulse response (IIR) filter given by:

$\hat{h}(t) = -\hat{h}(t-1)$ $a_1 -, \ldots, -\hat{h}(t-p)a$ $p + \bar{y}(t) \cdot$ $z(t;\hat{h}(t-1))*b$ $_0 + \bar{y}(t-1) \cdot z($ $t-1;\hat{h}(t$ $-2))*b_1+, \ldots, \bar{y}(t-q) \cdot$
$z(t-q;\hat{h}(t-q-1))*b_q$ where $a_i$ and $b_i$ are user-defined parameters as are the filter orders p and q.

Alternatively, there is also provided a channel estimator having two estimators, a first estimator that operates on a continuous pilot channel and a second estimator that operates on a traffic channel with interleaved pilot symbols. The estimator also includes a combiner that combines the output of the first and second estimators. The first estimator is similar to those of the prior art while the second estimator is similar to that described hereinabove.

Finally, the present invention includes the methods performed by the channel estimators disclosed herein.

BRIEF DESCRIPTION OF THE DRAWINGS
AND APPENDIX

The present invention will be understood and appreciated more fully from the following detailed description taken in conjunction with the appended drawings and Appendix in which.

DETAILED DESCRIPTION OF THE PRESENT
INVENTION

The present invention is a channel estimator for linearly modulated, digital communication schemes. It takes as input the downconverted and demodulated received signal, denoted by a vector $\bar{y}(t)$. For example, $\bar{y}(t)$ can be the output of despreaders in a code division, multiple access (CDMA) rake receiver (as known in the art) or the demodulator output in a PAM/QAM (pulse amplitude modulation/quadrature amplitude modulation) receiver (as also known in the art).

The present text will emphasize CDMA cellular systems; however, the present invention can be applied to any digital, linear modulation scheme.

It will be appreciated that, in a receiver having more than one antenna, different elements of the vector $\bar{y}(t)$ will correspond to the downconverted and demodulated signals from the different antennas. In a multiple antenna, CDMA receiver, there are multiple despreaders per antenna. The elements of the vector $\bar{y}(t)$ correspond to the output of all of the despreaders.

Various embodiments of channel estimator 22 are shown in FIGS. 2, 3A, 3B, 4, 5 and 6. To understand the structure of the channel estimator of the present invention, a derivation is first provided.

Derivation

The vector output $\bar{y}(t)$ at time instant t is modeled by a simplified static channel model as a function of the transmitted signal s(t), a vector of static channel taps $\bar{h}$, and a vector $\bar{n}(t)$ of noise samples. The model is:

$$\bar{y}(t) = \bar{h} \cdot s(t) + \bar{n}(t) \qquad \text{Equation 1}$$

It will be appreciated that:

$$\dim\{\bar{y}(t)\} = \dim\{\bar{h}\} = \dim\{\bar{n}(t)\} \leq \dim\{s(t)\} = 1$$

where $\dim\{\bar{v}\}$ stands for the dimension of the vector $\bar{V}$. Thus, the number of unknown channel taps is denoted by $\dim\{\bar{h}\}$ which is at least 1. For example, in a CDMA rake receiver, $\dim\{\bar{h}\}$ equals the number of active fingers. The noise term $\bar{n}(t)$ for a CDMA system represents the additive white Gaussian noise (AWGN), the cross-talks from other users, cross-talks from un-modeled channel taps (i.e. channel taps that do not correspond to any of the active fingers), etc. and the channel estimate $\bar{h}$ is the unknown finite dimensional parameter vector that needs to be estimated based on observation of $\bar{y}(t)$ for t=1,2, ..., T.

In accordance with a preferred embodiment of the present invention, the following assumptions are made in order to generate the channel estimator:

1. s(t) is a sequence of independent and identically distributed (i.i.d.) random variables of data symbols with time varying, a priori symbol probabilities $\bar{p}(t)$. For simplicity, s(t) will be considered herein as a quadrature phase shift keying (QPSK) signal.

2. $\bar{n}(t)$ is an i.i.d. sequence of complex valued, zero mean Gaussian random vectors with independent components whose variance is $\sigma^2$. Conventional circular Gaussian probability distribution functions (pdf's) are assumed, i.e. the real and imaginary parts of each of the noise components are independent with variance $\sigma^2/2$. The case of unequal noise variances (that is, when each component of $\bar{n}(t)$ possesses different variance) is also considered hereinbelow.

3. s(t) and $\bar{n}(t)$ are mutually independent.

The present invention defines a probability vector $\bar{p}(t)$ that defines the priori probabilities for the various symbols of s(t). In CDMA systems, signals are sent between a mobile and a base station in pre-defined time slots. In each time slot, many symbols are sent, only some of which are raw data symbols, e.g. the compressed voice data. The remaining symbols are used for controlling the communication, estimating the unknown channel taps, etc. Among these control symbols there are the pilot symbols, which, as described hereinabove, are a set of symbols that are a-priori known to the receiver. The pilot symbols are used to synchronize the base and mobile stations and for estimating the channel taps. Other control symbols include transmit power control (TPC) symbols. With the current standardization regarding $3^{rd}$ generation cellular systems (3GPP RAN wideband CDMA), these TPC symbols are known a-priori to have only one out of 2 possible values. The TPC symbols are defined in the 3GPP document, RAN 25.214 V1.1.1(1999-09). The probability vector $\bar{p}(t)$ allows the present invention to treat both pilot and data symbols.

For a QPSK symbol constellation, $\bar{p}(t)$ is defined as follows:

$$\bar{p}(t) = \begin{bmatrix} Pr\{s(t) = 1+j\} \\ Pr\{s(t) = 1-j\} \\ Pr\{s(t) = -1+j\} \\ Pr\{s(t) = -1-j\} \end{bmatrix} = \begin{bmatrix} p_1(t) \\ p_2(t) \\ p_3(t) \\ p_4(t) \end{bmatrix} \qquad \text{Equation 2}$$

If s(t) is a pilot symbol, then there exist some i, $1 \leq i \leq 4$ such that $$\bar{p}(t) = \bar{e}_i \qquad \text{Equation 3}$$

where the $\bar{e}_i$'s are the normal basis vectors having a one (1) in their i-th component and zero otherwise. The specific vector $\bar{e}_i$ used per time instant depends on the transmitted pilot symbol. For example, the following sequence of pilot symbols $$s(1)=1+j, \; s(2)=1-j, \; s(3)=1+j, \; s(4)=-1-j \qquad \text{Equation 4}$$

corresponds (from Equation 2) to the following sequence of $\bar{e}_i$'s $$\bar{p}(1)=\bar{e}_1, \; \bar{p}(2)=\bar{e}_2, \; \bar{p}(3)=\bar{e}_1, \; \bar{p}(4)=\bar{e}_4 \qquad \text{Equation 5}$$

If, on the other hand, s(t) is an equally likely data symbol, then $$p_1(t)=p_2(t)=p_3(t)=p_4(t)=0.25 \qquad \text{Equation 6}$$

Furthermore, if there is some a-priori information on the transmitted data, it can be incorporated herein. For example, the transmit power control (TPC) symbols are known a-priori to have only one out of 2 possible values either 1+j or −1−j. For TPC symbols, the corresponding $\bar{p}(t)$ would be $$\bar{p}(t) = \begin{bmatrix} 0.5 \\ 0 \\ 0 \\ 0.5 \end{bmatrix} \qquad \text{Equation 7}$$

Now, with the above assumptions, the conditional pdf of $\bar{y}(t)$ given s(t) and $\bar{h}$ is Gaussian and it is given by, $$P(\bar{y}(t)/s(t); \bar{h}) = c \cdot e^{-\frac{\|\bar{y}(t) - \bar{h} \cdot s(t)\|^2}{\sigma^2}}$$

$$= c \cdot e^{-\frac{1}{\sigma^2} \sum_{k=1}^{Dim\{\bar{y}\}} |y_k(t) - h_k \cdot s(t)|^2} \qquad \text{Equation 8}$$

Therefore, $$P(\bar{y}(t); \bar{h}) = c \left[ p_1(t) \cdot e^{-\frac{1}{\sigma^2} \sum_{k=1}^{Dim\{\bar{y}\}} |y_k(t) - h_k \cdot (1+j)|^2} + \right.$$
$$p_2(t) \cdot e^{-\frac{1}{\sigma^2} \sum_{k=1}^{Dim\{\bar{y}\}} |y_k(t) - h_k \cdot (1-j)|^2} +$$
$$p_3(t) \cdot e^{-\frac{1}{\sigma^2} \sum_{k=1}^{Dim\{\bar{y}\}} |y_k(t) - h_k \cdot (-1+j)|^2} +$$
$$\left. p_4(t) \cdot e^{-\frac{1}{\sigma^2} \sum_{k=1}^{Dim\{\bar{y}\}} |y_k(t) - h_k \cdot (-1-j)|^2} \right] \qquad \text{Equation 9}$$

Due to the i.i.d nature of both s(t) and $\bar{n}(t)$, the joint pdf of $\bar{y}(t)$ for t=1,2, ..., T is simply the product of the one dimensional pdf's, or in the log domain:

$$\text{Log}[P(\overline{Y};\overline{h})] = \sum_{t=1}^{T} \text{Log}\bigg[p_1(t) \cdot e^{-\frac{1}{\sigma^2}\sum_{k=1}^{Dim\{\overline{y}\}}|y_k(t)-h_k\cdot(1+j)|^2} +$$

$$p_2(t) \cdot e^{-\frac{1}{\sigma^2}\sum_{k=1}^{Dim\{\overline{y}\}}|y_k(t)-h_k\cdot(1-j)|^2} +$$

$$p_3(t) \cdot e^{-\frac{1}{\sigma^2}\sum_{k=1}^{Dim\{\overline{y}\}}|y_k(t)-h_k\cdot(-1+j)|^2} +$$

$$p_4(t) \cdot e^{-\frac{1}{\sigma^2}\sum_{k=1}^{Dim\{\overline{y}\}}|y_k(t)-h_k\cdot(-1-j)|^2}\bigg] + T \cdot \text{Log}[c]$$

Equation 10 where, for notational brevity, $\overline{Y}$ denotes the vector whose t-th sub-block is $\overline{y}(t)$ for t=1,2,..., T (i.e. $\overline{Y}$ is a (Dim{$\overline{y}$}·T)×1 column vector).

Now, maximum likelihood (ML) estimation of $\overline{h}$ amounts to differentiating Equation 10 with respect to $\overline{h}$ and equating to zero. To simplify the notation, we define $\overline{\phi}(t)$ as follows.

$$z(t;\overline{h}) \equiv \bigg[p_1(t)(1+j)e^{\frac{2}{\sigma^2}Real\{<\overline{y}(t),\overline{h}^*>\cdot(1-j)\}} + p_2(t)(1-j)e^{\frac{2}{\sigma^2}Real\{<\overline{y}(t),\overline{h}^*>\}} +$$

$$p_3(t)(-1+j)e^{\frac{2}{\sigma^2}Real\{<\overline{y}(t),\overline{h}^*>\cdot(-1-j)\}} + p_4(t)(-1-j)e^{\frac{2}{\sigma^2}Real\{<\overline{y}(t),}\times$$

$$\bigg[p_1(t)e^{\frac{2}{\sigma^2}Real\{<\overline{y}(t),\overline{h}^*>\cdot(1-j)\}} + p_2(t)e^{\frac{2}{\sigma^2}Real\{<\overline{y}(t),\overline{h}^*>\cdot(1+j)\}} + p_3(t)e^{\frac{2}{\sigma^2}Real\{<\overline{y}(t),\overline{h}^*>\cdot(-1-j)\}} + p_4(t)e^{\frac{2}{\sigma^2}Real\{<\overline{y}(t),\overline{h}^*>\cdot(-1+j)\}}\bigg]^{-1}$$

Equation 15

$$\overline{\phi}(t) = \bigg(\frac{\partial}{\partial Real\{\overline{h}\}} + j \cdot \frac{\partial}{\partial Imag\{\overline{h}\}}\bigg)\text{Log}[P(\overline{y}(t);\overline{h})]$$

Equation 11

The ML channel estimator is obtained by solving the implicit equation:

$$\sum_{t=1}^{T} \overline{\phi}(t) = \overline{0}$$

Equation 12

Using the equality below, $$p_1(t) \cdot e^{-\frac{1}{\sigma^2}\sum_{k=1}^{Dim\{\overline{y}\}}|y_k(t)-h_k\cdot(1+j)|^2} +$$

$$p_2(t) \cdot e^{-\frac{1}{\sigma^2}\sum_{k=1}^{Dim\{\overline{y}\}}|y_k(t)-h_k\cdot(1-j)|^2} +$$

$$p_3(t) \cdot e^{-\frac{1}{\sigma^2}\sum_{k=1}^{Dim\{\overline{y}\}}|y_k(t)-h_k\cdot(-1+j)|^2} +$$

$$p_4(t) \cdot e^{-\frac{1}{\sigma^2}\sum_{k=1}^{Dim\{\overline{y}\}}|y_k(t)-h_k\cdot(-1-j)|^2} =$$

$$e^{-\frac{1}{\sigma^2}(\|\overline{y}(t)\|^2+2\|\overline{h}\|^2)} \cdot \bigg[p_1(t) \cdot e^{\frac{2}{\sigma^2}Real\{<\overline{y}(t),\overline{h}^*>\cdot(1-j)\}} +$$

$$p_2(t) \cdot e^{\frac{2}{\sigma^2}Real\{<\overline{y}(t),\overline{h}^*>\cdot(1+j)\}} +$$

$$p_3(t) \cdot e^{\frac{2}{\sigma^2}Real\{<\overline{y}(t),\overline{h}^*>\cdot(-1-j)\}} +$$

$$p_4(t) \cdot e^{\frac{2}{\sigma^2}Real\{<\overline{y}(t),\overline{h}^*>\cdot(-1+j)\}}\bigg]$$

Equation 13 we obtain, after quite a few algebraic manipulations:

$$\overline{\phi}(t) = -\frac{4}{\sigma^2} \cdot \overline{h} + \frac{2}{\sigma^2} \cdot \overline{y}(t) \cdot z(t;\overline{h})^*$$

Equation 14 where $(\cdot)^*$ stands for the conjugate of the bracketed expression and the scalar process $z(t;\overline{h})$ is given by:

$<\overline{x}, \overline{y}>$ denotes the scalar product between the vectors $\overline{x}$ and $\overline{y}$. Combining Equation 12 and Equation 14, the ML estimator $\hat{h}_{ML}$ becomes the solution of the implicit equation:

$$\hat{h}_{ML} = \frac{1}{2T} \cdot \sum_{t=1}^{T} \overline{y}(t) \cdot z(t;\hat{h}_{ML})^*$$

Equation 16

It will be appreciated that, in the general setting, no closed form solution exists to Equation 16. However, there are some special cases of the ML estimator of Equation 16. First, consider the case of pilot symbols, by substituting Equation 3 into Equation 15: This results in:

$$z(t;\overline{h}) = s(t)$$

Equation 17 and Equation 16 reduces to:

$$\hat{h}_{ML} = \frac{1}{2T} \cdot \sum_{t=1}^{T} \overline{y}(t) \cdot s(t)^*$$

Equation 18 which is the conventional data-aided ML channel estimator.

In the non-data-aided setting where Equation 6 holds, Equation 15 reduces to:

$$z(t; h) = \Bigg[$$

$$(1+j) \cdot \sinh\left(\frac{2}{\sigma^2} Real\{<\bar{y}(t), \bar{h}^*> (1-j)\}\right) + (1-j) \cdot \sinh\left(\frac{2}{\sigma^2} Real\{<\bar{y}(t), \bar{h}^*> (1+j)\}\right)\Bigg] \times$$

$$\Bigg[\cosh\left(\frac{2}{\sigma^2} Real\{<\bar{y}(t), \bar{h}^*> (1-j)\}\right) + \cosh\left(\frac{2}{\sigma^2} Real\{<\bar{y}(t), \bar{h}^*> (1+j)\}\right)\Bigg]^{-1}$$

Equation 19

In a high SNR setting, it can be shown that, in both nominator and denominator of $z(t;\bar{h})$ only one of the exponents is dominant and hence, $$z(t;\bar{h}) \approx \hat{s}(t) \qquad \text{Equation 20}$$

where $\hat{s}(t)$ is the nearest neighbor to $<\bar{y}(t), \bar{h}^*>$ from the source alphabet (i.e. $\bar{s}(t)$ is the hard decision of $<\bar{y}(t), \bar{h}^*>$). In this case, the ML estimator reduces to:

$$\hat{h}_{ML} = \frac{1}{2T} \cdot \sum_{t=1}^{T} \bar{y}(t) \cdot \hat{s}(t)^* \qquad \text{Equation 21}$$

which is the well known, decision directed, channel estimator.

In a low SNR setting, the ML estimator of the present invention, in effect, uses a soft symbol metric that is based on the instantaneous SNR and follows a hyperbolic law. To illustrate this, reference is now made to FIGS. 1A, 1B and 1C which graph the function in Equation 19 for several SNR values (20 dB, 10 dB and 0 dB, respectively) and for the scalar case of one active finger. Each figure shows a scatter plot of the values of $z(t;\bar{h})$ in the complex plane.

Figure 1A:
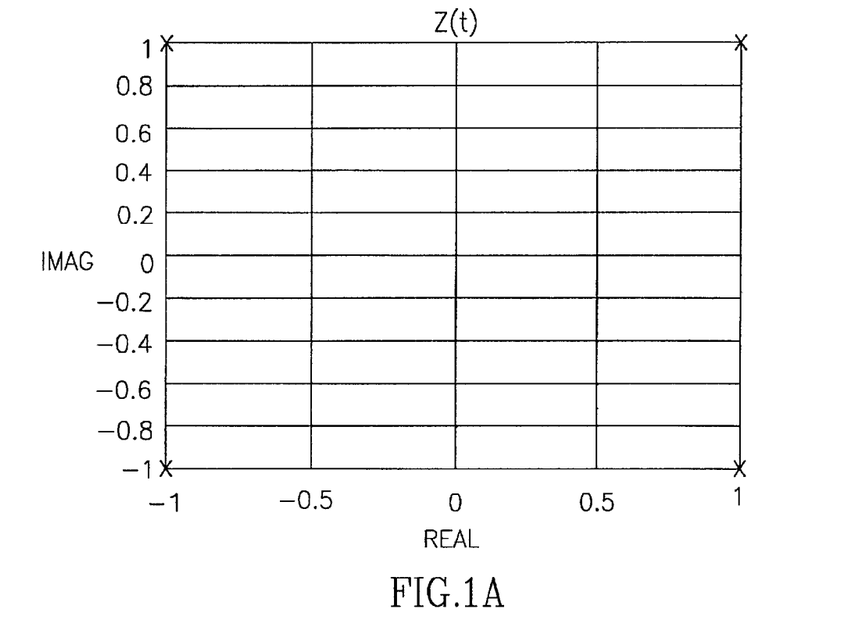
FIGS. 1A, 1B and 1C are scatter plot illustrations of the values of a function, in the presence of varying levels of noise, where the signal to noise ratio (SNR) is high, medium and low, respectively.
Figure 1B:
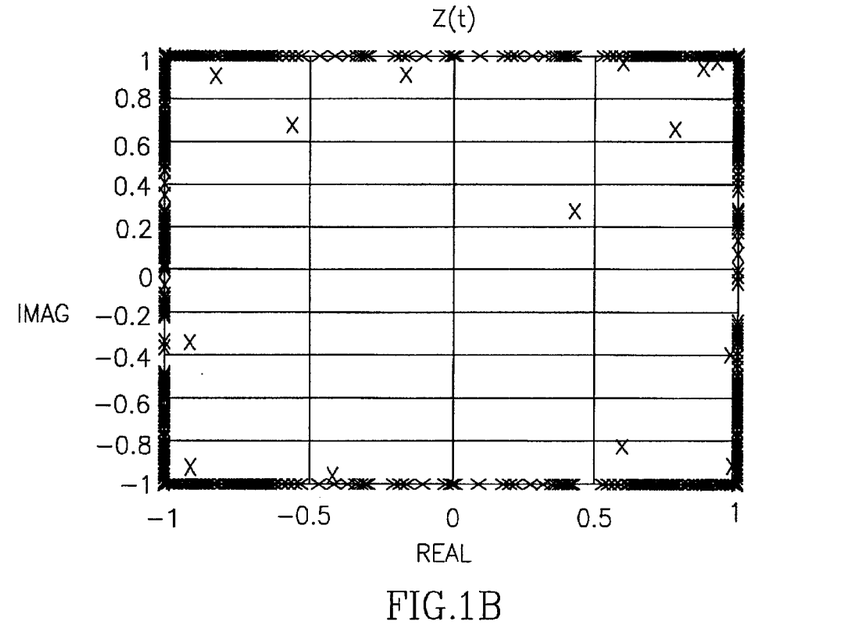
Figure 1C:
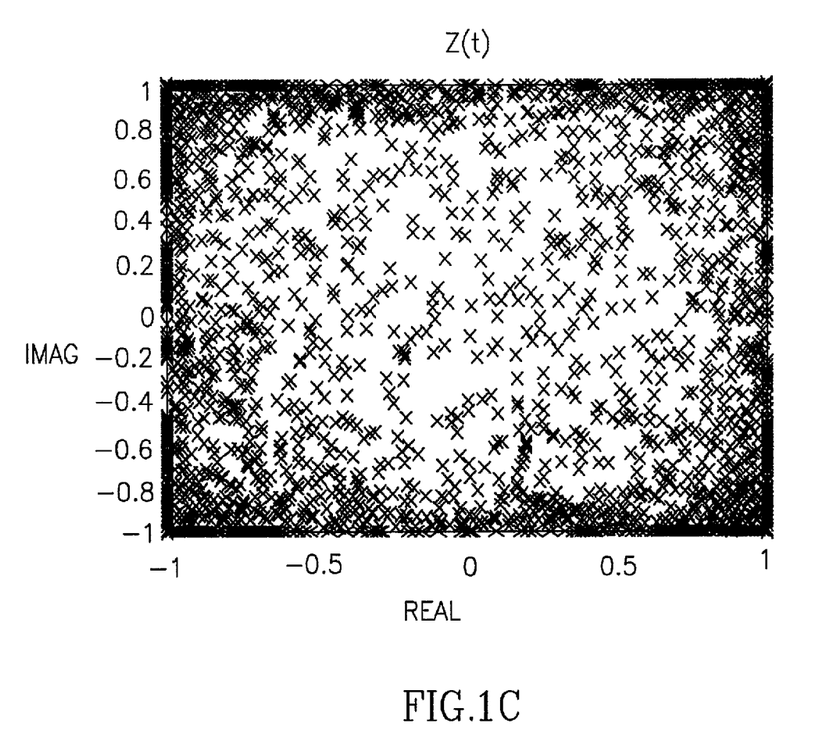

As can be seen, at the high SNR of FIG. 1A, $z(t;\bar{h})$ always takes on one of the four hard decision values (1−j), (1+j), (−1−j), (−1+j) of the received signal. This matches with Equation 20 and 21. However, at lower SNR's, $z(t;\bar{h})$ is "softened" according to the confidence of each specific hard decision. Thus, FIG. 1B (medium SNR) has values for $z(t; \bar{h})$ mostly along the real and imaginary axes and FIG. 1C (low SNR) has values for $z(t;\bar{h})$ all over the complex plane.

Until now, the noise variance has been identical for all elements of the noise vector $\bar{n}(t)$. It is also possible to relax this assumption. Thus, in Equation 15 and 19, the following $$\frac{2}{\sigma^2} Real\{<\bar{y}(t), \bar{h}^*>\ldots\} \qquad \text{Equation 22}$$

is replaced by $$2Real\{<\tilde{y}(t), \bar{h}^*>\ldots\} \qquad \text{Equation 23}$$

where $\tilde{y}(t)$ is obtained from $\bar{y}(t)$ by dividing each of its components by the corresponding noise variance, i.e.

$$\{\tilde{y}(t)\}_i \equiv \frac{\{\bar{y}(t)\}_i}{\sigma_i^2} \qquad \text{Equation 24}$$

Appendix A provides a series of approximations to Equation 19 to simplify its implementation.

In some applications, such as the 3GPP wideband CDMA cellular systems, there is a continuous pilot channel separate from a traffic channel that contains data and pilot symbols. For these applications, a channel estimator based on both the traffic and the pilot channels can be constructed. The channel estimator of the present invention can be used for the traffic channel while a prior art channel estimator can be used for the continuous pilot channel. The two channel estimates can be combined to produce the final channel estimate. This provides a statistically more stable channel estimator.

Implementation

Figure 2:
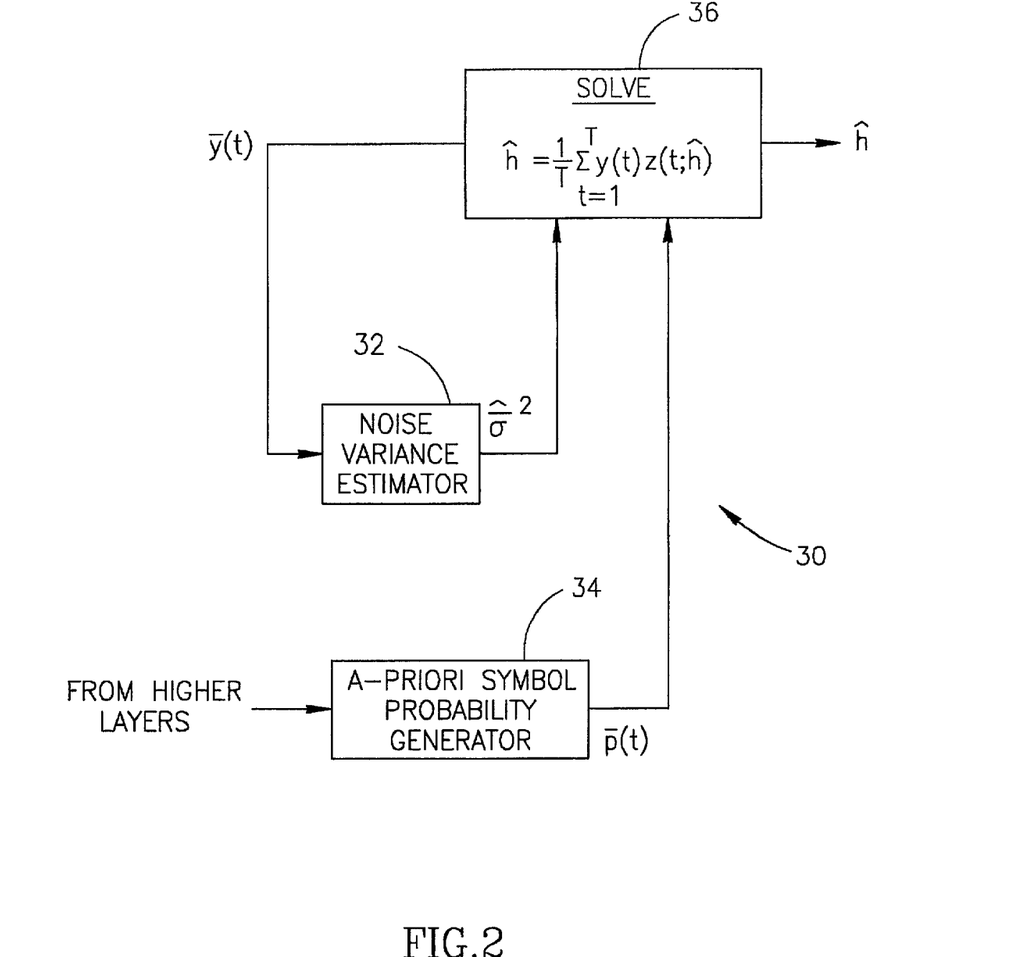
FIG. 2 is a schematic illustration of a batch mode channel estimator, constructed and operative in accordance with a preferred embodiment of the present invention.

Reference is now made to FIG. 2, which schematically illustrates a channel estimator 30 of the present invention. Estimator 30 comprises a noise variance estimator 32, an a priori symbol probability generator 34 and a channel tap determiner 36.

Noise variance estimator 32 determines the noise variance $\sigma^2$ as described hereinbelow. There are a variety of methods, known in the art, for estimating the noise variance $\sigma^2$. One method, incorporated herein by reference, is described in the article "An Efficient Algorithm for Estimating the Signal-to-Interference Ratio in TDMA Cellular Systems", by Mustafa Turkboylari et al., *IEEE Transactions on Communications*, Vol. 46, No. 6, June 1998, pp. 728–731.

Another method of estimating the noise variance, suitable for the 3GPP wideband CDMA time slot structure, uses pilot symbols only and implements the following equations for the k-th element of the noise variance vector $\vec{\sigma}^2$:

$$\hat{\sigma}_k^2(n) = (1-\alpha) \cdot \hat{\sigma}_k^2(n-1) + \alpha \cdot \sigma_k^2(n) \qquad \text{Equation 25}$$

Where the time index n is in units of slot, $\alpha$ is a user selectable exponential forgetting factor, and $$\tilde{\sigma}_k^2(n) \equiv \frac{1}{N_p} \sum_{t=1}^{N_p} \left|\frac{\bar{y}_k(t)}{G(t)} \cdot s(t)^*\right|^2 - \left|\frac{1}{N_p} \sum_{t=1}^{N_p} \frac{\bar{y}_k(t)}{G(t)} \cdot s(t)^*\right|^2 \qquad \text{Equation 26}$$

where $N_p$ is the number of pilot symbols per slot, $G(t)$ is the receiver's automatic gain control (AGC) level (as known in the art) and $\bar{y}_k(t)$ is the k-th element of the vector $\bar{y}(t)$.

Symbol probability generator 34 receives information from higher layers in the receiver defining the type of the current symbol. For example, the higher layer may indicate that the current symbol is a pilot, a power control or a data symbol. Symbol probability generator 34 then produces the probability vector $\bar{p}(t)$ associated with the symbol type, as per Equations 2–7.

Channel tap determiner 36 determines the channel tap estimate vector by solving Equation 16. Since Equation 16 is an implicit equation, one has to resort to iterative algorithms for solving it. There are numerous iterative approaches, based on gradients and/or Hessians of Equation 16 that can be implemented. See, for example, the book *Numerical Recipes in C: The Art of Scientific Computing*, by Press et al., 2nd Edition, Cambridge University Press, 1992.

Channel estimator 30 operates in a "batch" mode, taking a sequence of T samples (where T is a user selectable parameter often related to the fading rate) and iterating until the channel estimate $\bar{h}$ is stable.

As with any iterative algorithm, an initial point must be provided for the algorithm. There are a variety of initialization procedures. For example, one may arbitrarily set the initial $\bar{h}$ to unity and then apply the iterative algorithm to converge to the true value. Alternatively, one can apply a conventional channel estimation technique based only on pilot symbols and use its output as the initial value for $\bar{h}$.

Figure 3A:
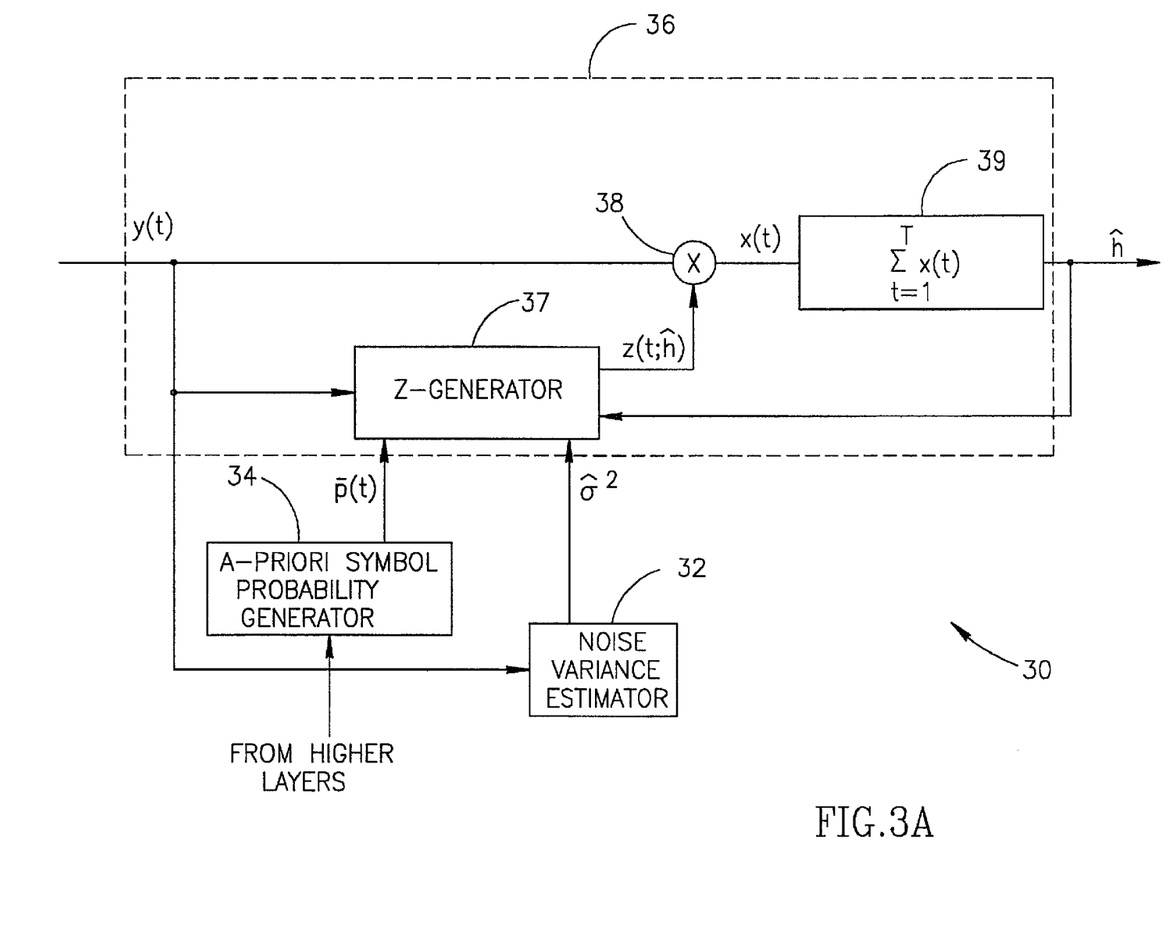
FIGS. 3A and 3B are schematic illustrations of implementations of the channel estimator of FIG. 2, for single and multiple CDMA fingers, respectively.

Reference is now made to FIG. 3A, which schematically illustrates the implementation of a simple iterative solution to Equation 16 that does not require calculation of gradients or Hessians. The channel estimator 30 of FIG. 3A is a single tap channel estimator.

In the embodiment of FIG. 3A, channel tap determiner 36 comprises a scalar z-generator 37, a multiplier 38 and a summer 39 over a period of length T of the output of vector multiplier 38.

Z-generator 37 receives the demodulated scalar signal y(t), the probability vector $\bar{p}(t)$ from probability generator 34, the noise variance $\hat{\sigma}^2$ from noise variance estimator 32 and the channel estimate h' of the previous iteration. Z-generator 37 then generates the scalar value z(t;h') from Equation 15. For example, this operation can utilize a lookup table. In particular, when Equation 19 needs to be computed, a lookup table can be used which saves the need to calculate the hyperbolic sine and cosine functions.

Multiplier 38 multiplies the output y(t) with the value z(t;h') and summer 39 sums the output of multiplier 38 over a period of length T. The result is the updated channel estimate h which is then fed back to z-generator 37.

Figure 3B:
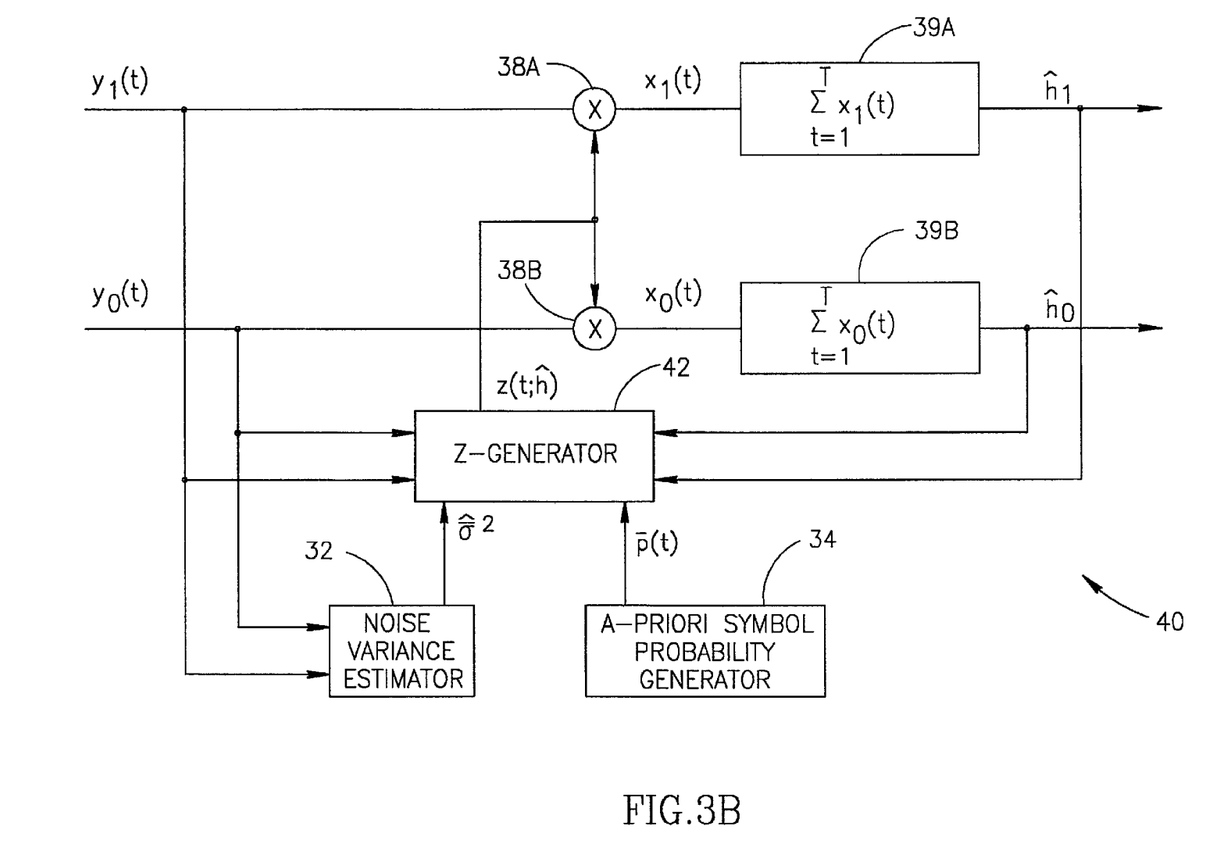

Reference is now made to FIG. 36, which schematically illustrates the structure of a two-tap batch channel estimator of the present invention, here labeled 40, when operating on a vector $\bar{y}(t)$ whose dimension is two. Elements similar to those of FIG. 3A carry similar reference numerals.

Channel estimator 40 comprises noise variance estimator 32, a z-generator 42, two multipliers 38A and 38B and two summers 39A and 39B. Z-generator 42 receives the demodulated vector signal $\bar{y}(t)$, the probability vector $\bar{p}(t)$ from probability generator 34, the noise variance $\hat{\sigma}^2$ from noise variance estimator 32 and the channel estimates $h_i'$ of the previous iteration.

Z-generator 42 then generates the value z(t;h') from Equation 15. Multipliers 38A and 38B multiply the outputs $y_0(t)$ and $y_1(t)$, respectively, with the value z(t;h') and summers 39A and 39B sum the outputs of their respective multipliers 38A and 38B over a period of length T. Each summer 39 produces its updated channel estimate $h_i$, which is also fed back to z-generator 42.

It will be appreciated that the present invention is also operative for more than two taps. The structure of the channel estimator is similar to that of FIG. 3B.

The channel estimator of the present invention can also be implemented in a sequential (or adaptive) manner. For these implementations, the channel estimator updates the estimate one sample at a time. This amounts to finding a sequential solution to Equation 16 and it typically takes some time to converge. Adaptive solutions inherently assume a slowly time-varying channel so that channel variations can be tracked. Initialization for these implementations is as described hereinabove.

Figure 4:
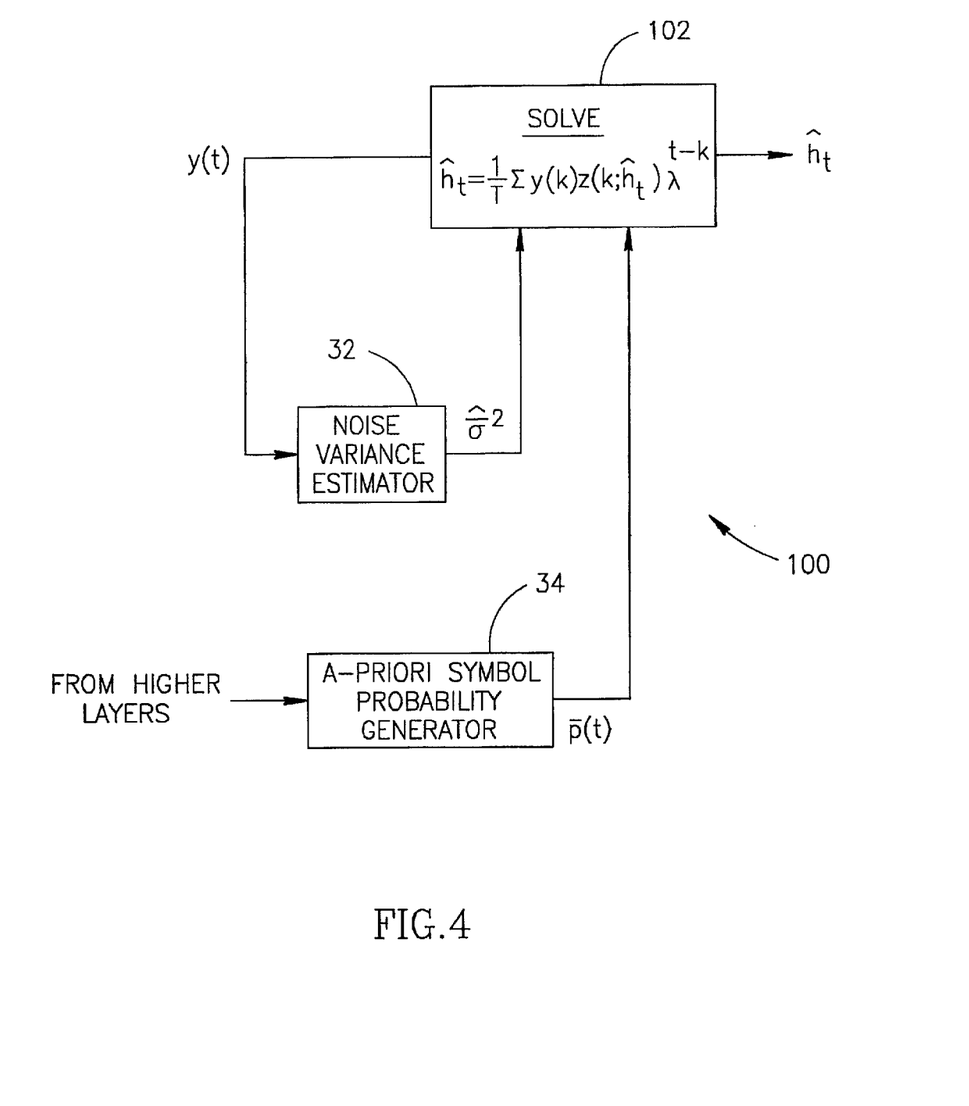
FIG. 4 is a schematic illustration of an adaptive channel estimator, constructed and operative in accordance with a preferred embodiment of the present invention.

Reference is now made to FIG. 4, which illustrates a general adaptive channel estimator 100. Estimator 100 is similar to estimator 30 of FIG. 2 and comprises an adaptive channel tap determiner 102 in place of channel tap determiner 36.

Adaptive channel tap determiner 102 sequentially solves Equation 27 (hereinbelow) where, for each new time instance t, a new solution is obtained.

$$\hat{h}_t = \sum_{m=1}^{t} \bar{y}(m) \cdot z(m; \hat{h}_t)^* \cdot \lambda^{t-m} \quad \text{Equation 27}$$

$\lambda$ is an exponential forgetting factor. With the special choice of $\lambda=1$, Equation 27 reduces to Equation 16 up to a scalar gain.

There are a variety of sequential algorithms, two of which are presented hereinbelow.

A first approach uses anchors and linear interpolation between adjacent anchors similar to the one described in the following documents that are incorporated herein by reference:

H. Andoh, M. Sawahashi, and F. Adachi, "Channel Estimation Using Time Multiplexed Pilot Symbols for Coherent Rake Combining for DS-CDMA Mobile Radio," *Proceedings of the IEEE Vehicular Technology Conference*, 1997, pp. 954–958.

F. Adachi and M. Sawahashi, "Wideband Wireless Access Based on DS-CDMA," *IEEE Transactions on Communications*, pp. 1305–1316, July 1998.

F. Adachi, M. Sawahashi, and H. Suda, "Wideband DS-CDMA for Next Generation Mobile Communications Systems," *IEEE Communications Magazine*, September 1998.

Figure 5:
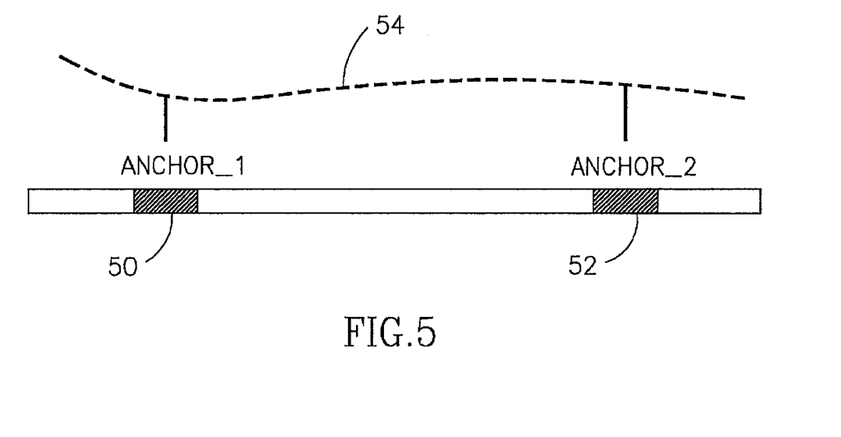
FIG. 5 is a schematic illustration of two anchors, useful in understanding an anchor embodiment of the channel estimator of FIG. 4.

In the prior art anchor approach, illustrated in FIG. 5 to which reference is now briefly made, the channel estimator averages a few pilot symbols from the beginning of each of a series of successive time-slots to generate a sequence of "anchors" 50 and 52. Then, the channel estimator linearly interpolates between the anchor at the beginning of one slot to that at the beginning of the next slot to generate the channel estimates 54.

In accordance with a preferred embodiment of the present invention, the channel estimator computes a pilot anchor $\hat{h}_p$ using the $N_p$ pilot symbols of one time slot and a data anchor $\hat{h}_s$ using $N_s$ data symbols, as follows:

$$\hat{h}_p = \frac{1}{2N_p} \cdot \sum_{k=1}^{N_p} \bar{y}(k) \cdot s(k)^* \quad \text{Equation 28}$$

$$\hat{h}_s = \frac{1}{2N_s} \cdot \sum_{k=1}^{N_p} y(k) \cdot z(k; \hat{h}_p)^* \quad \text{Equation 29}$$

where $N_s$ is a user-defined parameter determining the number of data symbols to be used. One may set $N_s=2N_p$ so that $N_p$ of the data symbols are taken from before the pilot symbols and $N_p$ of the data symbols are taken from after the pilot symbols. The channel estimator then averages the two values:

$$\hat{h}_{anchor} = \frac{\hat{h}_p + \hat{h}_s}{2} \quad \text{Equation 30}$$

The channel estimator linearly interpolates between adjacent anchors $\hat{h}_{anchor}(n-1)$ and $\hat{h}_{anchor}(n)$ to obtain the channel estimates for the n-th slot. In accordance with a preferred embodiment of the present invention, the channel estimator separately interpolates the amplitudes and phases of the adjacent anchors.

In order to improve upon the statistical variability of the anchors, the older anchor can be averaged, as follows:

$$\hat{H}_{anchor}(n-1) = \frac{\sum_{k=-M}^{M} \hat{h}_{anchor}(n-1-k) \cdot \beta_k}{\sum_{k=-M}^{M} \beta_k} \quad \text{Equation 31}$$

and, as before, phase and amplitude linear interpolations between $\hat{H}_{anchor}(n-1)$ and $\hat{h}_{anchor}(n)$ generate the n-th slot channel estimator. Both M and the $\beta_k$'s are user defined parameters. For example, the values M=1, $\beta_{-1}=\beta_1=0.8$ and $\beta_0=1$ were used in H. Andoh, M. Sawahashi, and F. Adachi, "Channel Estimation Using Time Multiplexed Pilot Symbols for Coherent Rake Combining for DS-CDMA Mobile Radio," *Proceedings of the IEEE Vehicular Technology Conference*, 1997, pp. 954–958.

Figure 6:
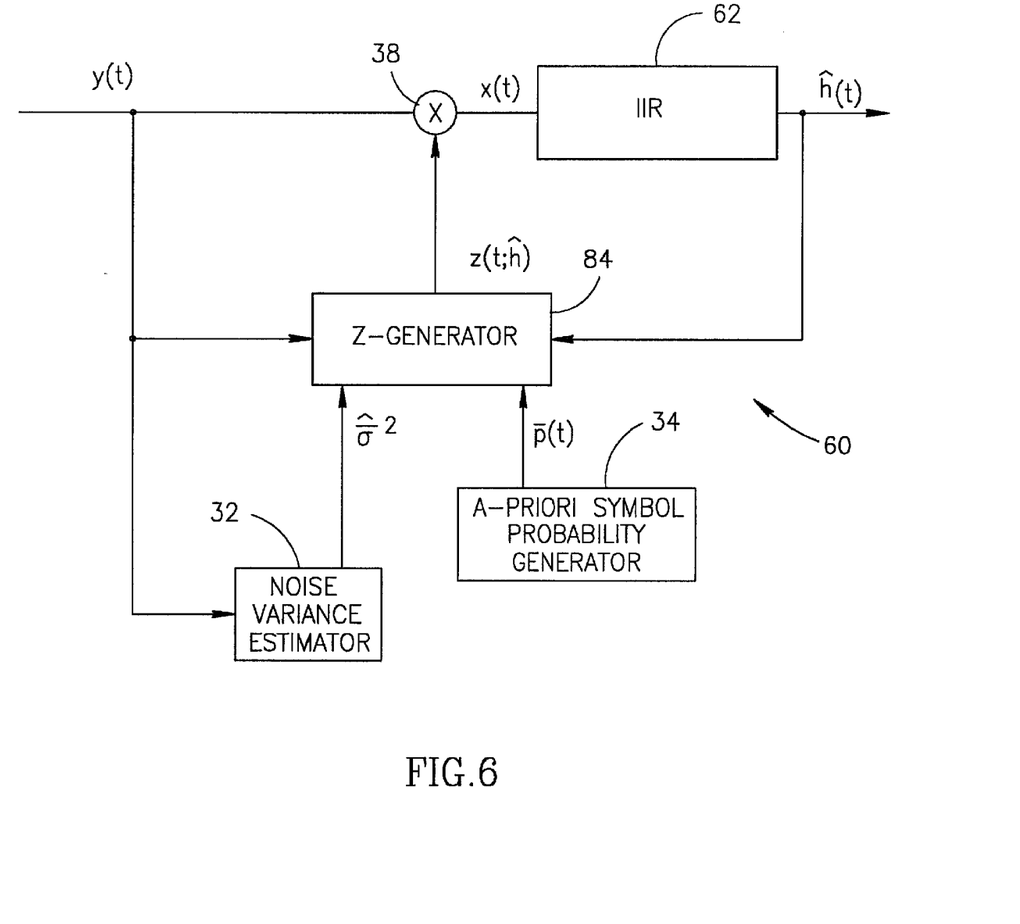
FIG. 6 is a schematic illustration of an implementation of the channel estimator of FIG. 4, for a single finger; and Appendix A provides a series of approximations to a main component of the channel estimator to simplify its implementation.

Reference is now made to FIG. 6, which illustrates another adaptive channel estimator, labeled 60. Channel estimator 60 is similar to channel estimator 30 of FIG. 3A except that summer 39 is replaced by an infinite impulse response (IIR) filter 62.

In this embodiment, the product $\bar{y}(t) \cdot z(t;\bar{h})$ is filtered with some pre-specified IIR filter. Here, we have the channel estimator given by:

$\hat{h}(t) = -$ $\hat{h}(t-1)$ $a_1 -, \ldots, -\hat{h}($ $t-p)a_p + \bar{y}(t) \cdot$ $z(t;\hat{h}(t-1))*b$ $_0 + \bar{y}(t-1) \cdot z(t$ $-1;\hat{h}(t-2))*b_1$ $+, \ldots, \bar{y}-(t-q) \cdot$ $z(t-q;\hat{h}(t-q-1))*b_q$ Equation 32 where $z(t;\hat{h}(t-1))$ is given by Equation 17 for pilot symbols, and by Equation 19 for data symbols (or by a similar expression for TPC bits). The filter coefficients $a_i$ and $b_i$ are user-defined parameters as are the filter orders p and q. Note that taking p=q=1 reduces to the well known exponential forgetting factor sequential solution of Equation 32 where the iterations are performed sequentially in time. In general, the specific choice of filter parameters, should represent the best compromise between noise rejection and filter delay. In order to maintain a low complexity implementation, the data should be decimated prior to applying Equation 32. For example, for a constant input rate of 16 ksps, one of 4 samples is used in Equation 32 when the symbol rate is 64 ksps. However, the pilot symbols should not be decimated. Thus, for a slot containing 4 pilot symbols and 36 data symbols, the estimator uses 10 samples per slot, 4 of which correspond to pilot symbols and the other 6 correspond to data symbols. The data can also be averaged prior to the filtration operation, rather than decimated. A further alternative is to combine the two approaches and use averaged symbols only at the feedback part of Equation 32 (i.e. the terms multiplied by the $a_i$). This produces a very slowly varying, adaptive channel estimator but does not increase the estimator's delay. Such slowly varying estimators can be utilized to track slowly fading channels.

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

It will be appreciated by persons skilled in the art that the present invention is not limited by what has been particularly shown and described herein above. Rather the scope of the invention is defined by the claims that follow after the appendix.

APPENDIX A

There are several simple approximations that can be used in Equation 19 in order to simplify the implementation. First we may replace the operands of the sinh operator as follows:

$$\frac{2}{\sigma^2}\text{Real}\{<\bar{y}(t), \bar{h}^*> (1-j)\} \approx \frac{2}{\sigma^2}\text{Max}_i|\text{Real}\{\bar{y}_i(t) \cdot \bar{h}_i^* \cdot (1-j)\}| \cdot \text{Sign}[\text{Real}\{\bar{y}_i(t) \cdot h_i^* \cdot (1-j)\}] \quad \text{Equation A-1}$$

$$\frac{2}{\sigma^2}\text{Real}\{<\bar{y}(t), \bar{h}^*> (1+j)\} \approx \frac{2}{\sigma^2}\text{Max}_i|\text{Real}\{\bar{y}_i(t) \cdot \bar{h}_i^* \cdot (1+j)\}| \cdot \text{Sign}[\text{Real}\{\bar{y}_i(t) \cdot \bar{h}_i^* \cdot (1-j)\}]$$

Note that this approximation simply uses the finger with the highest temporal SNR to estimate the transmitted symbol. This is a well-known selection criterion used in numerous diversity combining scenarios and contrasts with the original criterion of Equation 19, which is a maximal ratio diversity combination criterion. If we further approximate and consider only the maximum of the two terms in Equation A-1, then Equation 19 reduces to $$z(t;\hat{h}_{ML}) \approx \hat{s}(t) \cdot \tanh(x(t)) \quad \text{Equation A-2}$$

where $$x(t) \equiv \frac{2}{\sigma^2}\text{Max}\{\text{Max}_i|\text{Real}\{\bar{y}_i(t) \cdot \bar{h}_i^*(1-j)\}|, \text{Max}_i|\text{Real}\{\bar{y}_i(t)\bar{h}_i^*(1-j)\}|\} \quad \text{Equation A-3}$$

A further approximation can be implemeted when considering the case of unequal noise variance, i.e. the case where each component of $\bar{n}(t)$ possesses a different variance. The log-likelihood function of equation 10 should, in this case, be replaced by $$P(\bar{y}(t); \bar{h}) = c \Big[ p_1(t) \cdot e^{-\sum_{k=1}^{Dim(\bar{y})} |y_k(t) - h_k \cdot (1+j)|^2 / \sigma_i^2} + \text{Equation A-4}$$
$$p_2(t) \cdot e^{-\sum_{k=1}^{Dim(\bar{y})} |y_k(t) - h_k \cdot (1-j)|^2 / \sigma_i^2} +$$
$$p_3(t) \cdot e^{-\sum_{k=1}^{Dim(\bar{y})} |y_k(t) - h_k \cdot (-1+j)|^2 / \sigma_i^2} +$$
$$p_4(t) \cdot e^{-\sum_{k=1}^{Dim(\bar{y})} |y_k(t) - h_k \cdot (-1-j)|^2 / \sigma_i^2} \Big]$$

What is claimed is:

1. A channel estimator to operate on at least one received signal, the channel estimator comprising:

a symbol probability generator to generate a priori probabilities only of transmitted symbols found in said at least one received signal;

a noise variance estimator to estimate at least one noise variance corrupting said at least one received signal;

a channel tap estimator to generate channel estimates from said at least one received signal, said a priori probabilities and said at least one noise variance; and wherein said channel tap estimator is able to solve the following equation:

$$h_{ML} = \frac{1}{2T} \cdot \sum_{t=1}^{T} \bar{y}(t) \cdot z(t; h_{ML})^*$$

where $\bar{y}(t)$ is a vector of downconverted and demodulated received signal of said at least one received signal, t is the time variable, $h_{ML}$ is a ML channel estimator where ML denotes Maximum Likelihood, T is the sampling time, $z(t;h_{ML})$ is a mathematical scalar process, and $(\cdot)^*$ denotes the conjugate of the bracketed expression.

2. A channel estimator according to claim 1 and wherein said channel tap estimator comprises:

z-means for generating a z-value for $z(t;\hat{h}_{ML})$ from said a priori probabilities, said at least one noise variance and said channel estimates;

combining means for combining said z-value with said at least one received signal; and channel tap means for determining channel tap values from the output of said combining means.

3. A channel estimator according to claim 2 and wherein said z-means is able to calculate the following equation for a quadrature phase shift keying (QPSK) channel:

$$z(t; \bar{h}) \equiv \Big[ p_1(t)(1+j)e^{\frac{2}{\sigma^2}\text{Real}\{<\bar{y}(t), \bar{h}^*>(1-j)\}} +$$
$$p_2(t)(1-j)e^{\frac{2}{\sigma^2}\text{Real}\{<\bar{y}(t), \bar{h}^*>(1+j)\}} +$$
$$p_3(t)(-1+j)e^{\frac{2}{\sigma^2}\text{Real}\{<\bar{y}(t), \bar{h}^*>(-1-j)\}} +$$
$$p_4(t)(-1-j)e^{\frac{2}{\sigma^2}\text{Real}\{<\bar{y}(t), \bar{h}^*>(-1+j)\}} \Big] \times$$
$$\Big[ p_1(t)e^{\frac{2}{\sigma^2}\text{Real}\{<\bar{y}(t), \bar{h}^*>(1-j)\}} +$$
$$p_2(t)e^{\frac{2}{\sigma^2}\text{Real}\{<\bar{y}(t), \bar{h}^*>(1+j)\}} +$$
$$p_3(t)e^{\frac{2}{\sigma^2}\text{Real}\{<\bar{y}(t), \bar{h}^*>(-1-j)\}} +$$
$$p_4(t)e^{\frac{2}{\sigma^2}\text{Real}\{<\bar{y}(t), \bar{h}^*>(-1+j)\}} \Big]^{-1}$$

where $\bar{y}(t)$ is a vector of downconverted and demodulated received signal resulting from said at least one received signal, $\bar{h}$ is a vector of said channel tap estimates, $(\cdot)^*$ denotes the conjugate of the bracketed expression, $\sigma$ is the noise variance estimate and $p_1$, $p_2$, $p_3$ and $p_4$ are said quadrant symbol probabilities, and where s(t) is a sequence of independent and identically distributed random variables of data symbols with time varying, a priori symbol probabilities.

4. A channel estimator according to claim 3 and wherein, when s(t) is a pilot symbol, then $\bar{p}(t)=\bar{e}_i$ where the $\bar{e}_i$'s are the normal basis vectors having a one (1) in their i-th component and zero otherwise.

5. A channel estimator according to claim 2 and wherein said channel tap means is a summer over a window of received symbols.

6. A channel estimator according to claim 3 and wherein, when s(t) is a data symbol, then $p_1(t)=p_2(t)=p_3(t)=p_4(t)=0.25$.

7. A channel estimator according to claim 3 and wherein, when s(t) is a transmit power control (TPC) symbols, then $p_1(t)=p_4(t)=0.5, p_2(t)=p_3(t)=0$.

8. A channel estimator according to claim 2 and wherein said channel tap means includes means for determining a pilot anchor $h_p$ using $N_p$ pilot symbols of one time slot n and a data anchor $h_s$ using $N_s$ data symbols of said time slot n, means for averaging said pilot anchor and said data anchor to produce a slot anchor $h_{anchor}(n)$ and means for linearly interpolating between adjacent anchors $h_{anchor}(n-1)$ and $h_{anchor}(n)$ to obtain channel estimates for the n-th slot.

9. A channel estimator according to claim 8 wherein $N_s=2N_p$ and $N_p$ of the data symbols are taken from before said pilot symbols of said time slot and $N_p$ of the data symbols are taken from after said pilot symbols.

10. A channel estimator according to claim 8 and wherein said means for linearly interpolating includes means for separately interpolating amplitudes and phases of said adjacent anchors.

11. A channel estimator according to claim 8 and also including means for averaging slot anchors as follows:

$$H_{anchor}(n-1) = \frac{\sum_{k=-M}^{M} h_{anchor}(n-1-k) \cdot \beta_k}{\sum_{k=-M}^{M} \beta_k}$$

where $H_{anchor}(n-1)$ is an averaged older anchor, $h_{anchor}$ is an anchor channel estimator of the $n^{th}$ slot, $\beta_k$ is a user defined weight factor and M is the averaging limit.

12. A channel estimator according to claim 2 and wherein said z-means include lookup table means.

13. A channel estimator according to claim 2 and wherein said channel tap means is an infinite impulse response (IIR) filter given by:

$$h(t) = -h(t-1)a_1$$
$$-, \ldots, -h(t-p)a_p$$
$$+\bar{y}(t) \cdot z(t;h(t-1))^* b_0$$
$$+\bar{y}(t-1) \cdot z(t-1;h(t-2))^* b_1 +, \ldots, \bar{y}(t-q) \cdot z(t-q;h(t-q-1))^* b_q$$

where $a_i$ and $b_i$ are user-defined parameters as are the filter orders p and q, and h(t) is the channel estimator.

14. A channel estimator operating on at least one received signal, the channel estimator comprising:
   a symbol probability generator to generate a priori probabilities only of transmitted symbols found in said at least one received signal;
   a noise variance estimator to estimate at least one noise variance corrupting said at least one received signal;
   a channel tap estimator to generate channel estimates from said at least one received signal, said a priori probabilities and said at least one noise variance, and
   wherein said noise variance estimator is able to generate a noise variance $\bar{\sigma}^2$ as follows:

$$\sigma_k^2(n) = (1-\alpha) \cdot \sigma_k^2(n-1) + \alpha \cdot \sigma_k^2(n)$$

where $\bar{\sigma}_2$ is the noise variance vector, $\sigma_k^2$ is the noise variance for the k-th element, k is the element numerator, the time index n is in units of slot, $\alpha$ is a user selectable exponential forgetting factor and $\sigma_k^2$ is defined by $$\tilde{\sigma}_k^2(n) \equiv \frac{1}{N_P} \sum_{t=1}^{N_P} \left| \frac{\bar{y}_k(t)}{G(t)} \cdot (s(t))^* \right|^2 - \left| \frac{1}{N_P} \sum_{t=1}^{N_P} \frac{\bar{y}_k(t)}{G(t)} \cdot (s(t))^* \right|^2$$

where $N_p$ is the number of pilot symbols per slot, G(t) is an automatic gain control (AGC) level and $\bar{y}_k(t)$ is the k-th element of the vector $\bar{y}(t)$, s(t) is a sequence of independent and identically distributed random variables of data symbols with time varying, a priori symbol probabilities and $(\cdot)^*$ denotes the conjugate of the bracketed expression.

15. A method of estimating a channel using at least one received signal, the method comprising:
   generating a priori probabilities only of transmitted symbols found in said at least one received signal;
   estimating at least one noise variance corrupting said at least one received signal;
   generating channel estimates from said at least one received signal, said a priori probabilities and said at least one noise variance,
   wherein generating said channel estimates solves the following equation:

$$h_{ML} = \frac{1}{2T} \cdot \sum_{t=1}^{T} \bar{y}(t) \cdot z(t; h_{ML})^*$$

where $\bar{y}(t)$ is a vector of downconverted and demodulated received signal of said at least one received signal, t is the time variable, $h_{ML}$ is a ML channel estimator where ML denotes Maximum Likelihood, T is the sampling time, $z(t;h_{ML})$ is a mathematical scalar process, and $(\cdot)^*$ stands to denote the conjugate of the bracketed expression.

16. A method according to claim 15 and wherein said second step of generating comprises the steps of:
   generating a z-value for $z(t;\hat{h}_{ML})$ from said a priori probabilities, said at least one noise variance and said channel estimates;
   combining said z-value with said at least one received signal; and
   determining channel tap values from the output of said step of combining.

17. A method according to claim 16 and wherein said step of generating said z value comprising calculating the following equation for a quadrature phase shift keying (QPSK) channel:

$$z(t;\bar{h}) \equiv \left[ p_1(t)(1+j)e^{\frac{2}{\sigma^2}\text{Real}\{<\bar{y}(t),\bar{h}^*>(1-j)\}} + \right.$$
$$p_2(t)(1-j)e^{\frac{2}{\sigma^2}\text{Real}\{<\bar{y}(t),\bar{h}^*>(1+j)\}} +$$
$$p_3(t)(-1+j)e^{\frac{2}{\sigma^2}\text{Real}\{<\bar{y}(t),\bar{h}^*>(-1-j)\}} +$$
$$\left. p_4(t)(-1-j)e^{\frac{2}{\sigma^2}\text{Real}\{<\bar{y}(t),\bar{h}^*>(-1+j)\}} \right] \times$$
$$\left[ p_1(t)e^{\frac{2}{\sigma^2}\text{Real}\{<\bar{y}(t),\bar{h}^*>(1-j)\}} + \right.$$
$$p_2(t)e^{\frac{2}{\sigma^2}\text{Real}\{<\bar{y}(t),\bar{h}^*>(1+j)\}} +$$
$$p_3(t)e^{\frac{2}{\sigma^2}\text{Real}\{<\bar{y}(t),\bar{h}^*>(-1-j)\}} +$$
$$\left. p_4(t)e^{\frac{2}{\sigma^2}\text{Real}\{<\bar{y}(t),\bar{h}^*>(-1+j)\}} \right]^{-1}$$

where $\bar{y}(t)$ is a vector of downconverted and demodulated received signal of said at least one received signal, $\bar{h}$ is a vector of said channel tap estimates, $(\cdot)^*$ denotes the conjugate of the bracketed expression, $\sigma$ is the noise variance estimate and $p_1, p_2, p_3$ and $p_4$ are said quadrant symbol probabilities, and where s(t) is a sequence of independent and identically distributed random variables of data symbols with time varying, a priori symbol probabilities.

18. A method according to claim 17 and wherein, when s(t) is a pilot symbol, then $\bar{p}(t) = \bar{e}_i$ where the $\bar{e}_i$'s are the normal basis vectors having a one (1) in their i-th component and zero otherwise.

19. A method according to claim 16 and wherein said step of determining sums over a window of received symbols.

20. A method according to claim 17 and wherein, when s(t) is a data symbol, then $$p_1(t)=p_2(t)=p_3(t)=p_4(t)=0.25.$$

21. A method according to claim 17 and wherein, when s(t) is a transmit power control (TPC) symbols, then $$p_1(t)=p_4(t)=0.5, p_2(t)=p_3(t)=0.$$

22. A method according to claim 16 and wherein said step of determining includes the steps of determining a pilot anchor $\hat{h}_p$ using $N_p$ pilot symbols of one time slot n and a data anchor $\hat{h}_s$ using $N_s$ data symbols of said time slot n, averaging said pilot and data anchors to produce a slot anchor $\hat{h}_{anchor}(n)$ and linearly interpolating between adjacent anchors $\hat{h}_{anchor}(n-1)$ and $\hat{h}_{anchor}(n)$ to obtain channel estimates for the n-th slot.

23. A method according to claim 22 wherein $N_s=2N_p$ and $N_p$ of the data symbols are taken from before said pilot symbols of said time slot and $N_p$ of the data symbols are taken from after said pilot symbols.

24. A method according to claim 22 and wherein said step of linearly interpolating includes the step of separately interpolating amplitudes and phases of said adjacent anchors.

25. A method according to claim 22, further comprising averaging slot anchors as follows:

$$H_{anchor}(n-1) = \frac{\sum_{k=-M}^{M} h_{anchor}(n-1-k) \cdot \beta_k}{\sum_{k=-M}^{M} \beta_k}$$

where $H_{anchor}(n-1)$ is an averaged older anchor, $h_{anchor}$ is an anchor channel estimator of the $n^{th}$ slot, $\beta_k$ is a user defined weight factor and M is the averaging limit.

26. A method according to claim 16 and wherein determining said channel tap values comprises filtering said channel tap values with an infinite impulse response (IIR) filter given by:

$$h(t)=-h(t-1)a_1-,\ldots,-h(t-p)a_p+\bar{y}(t)\cdot z(t;h(t-1))*b_0 +\bar{y}(t-1)\cdot z(t-1;h(t-2))*b_1+,\ldots,\bar{y}(t-q)\cdot z(t-q;h(t-q-1))*b_q$$

where $a_i$ and $b_i$ are user-defined parameters as are the filter orders p and q, and h(t) is the channel estimator.

27. A method of estimating a channel using at least one received signal, the method comprising:
generating a priori probabilities only of transmitted symbols found in said at least one received signal;
estimating at least one noise variance corrupting said at least one received signal;
generating channel estimates from said at least one received signal, said a priori probabilities and said at least one noise variance, and
wherein estimating said at least one noise variance comprises generating a noise variance $\bar{\sigma}^2$ a as follows:

$$\sigma_k^2(n)=(1-\alpha)\cdot\sigma_k^2(n-1)+\alpha\cdot\sigma_k^2(n)$$

where $\bar{\sigma}^2$ is the noise variance vector, $\bar{\sigma}_k^2$ is the noise variance for the k-th element, k is the element numerator, the time index n is in units of slot, $\alpha$ is a user selectable exponential forgetting factor and $\sigma_k^2$ is defined by $$\hat{\sigma}_k^2(n) \equiv \frac{1}{N_P}\sum_{t=1}^{N_P}\left|\frac{\bar{y}_k(t)}{G(t)}\cdot(s(t))^*\right|^2 - \left|\frac{1}{N_P}\sum_{t=1}^{N_P}\frac{\bar{y}_k(t)}{G(t)}\cdot(s(t))^*\right|^2$$

where Np is the number of pilot symbols per slot, G(t) is an automatic gain control (AGC) level and $\bar{y}_k(t)$ is the k-th element of the vector $\bar{y}(t)$, s(t) is a sequence of independent and identically distributed random variables of data symbols with time varying, a priori symbol probabilities and $(\cdot)^*$ denotes the conjugate of the bracketed expression.

* * * * *